(12) United States Patent
Norcini et al.

(10) Patent No.: US 7,202,012 B2
(45) Date of Patent: Apr. 10, 2007

(54) COMPOSITIONS FOR POSITIVE HEAT SENSITIVE LITHOGRAPHIC PRINTING PLATES

(75) Inventors: Gabriele Norcini, Comabbio (IT); Stefano Romagnano, Gallarate (IT); Marco Visconti, Varese (IT); Giuseppe Li Bassi, Gavirate (IT)

(73) Assignee: Lamberti SpA, Albizzate (IT)

( * ) Notice: Subject to any disclaimer, the term of this patent is extended or adjusted under 35 U.S.C. 154(b) by 79 days.

(21) Appl. No.: 10/508,277

(22) PCT Filed: Mar. 18, 2003

(86) PCT No.: PCT/EP03/02800

§ 371 (c)(1),
(2), (4) Date: Apr. 6, 2005

(87) PCT Pub. No.: WO03/080340

PCT Pub. Date: Oct. 2, 2003

(65) Prior Publication Data

US 2005/0181298 A1    Aug. 18, 2005

(30) Foreign Application Priority Data

Mar. 22, 2002    (IT) .............................. VA02A0029

(51) Int. Cl.
*G03F 7/032* (2006.01)

(52) U.S. Cl. .................... 430/270.1; 430/302; 101/453

(58) Field of Classification Search ............. 430/270.1, 430/302; 101/453
See application file for complete search history.

(56) References Cited

U.S. PATENT DOCUMENTS 4,772,534 A * 9/1988 Kawamura et al. ......... 430/176
2002/0172889 A1* 11/2002 Oohashi .................. 430/273.1

FOREIGN PATENT DOCUMENTS

JP       11-084644      *   3/1999

* cited by examiner

*Primary Examiner*—Barbara L. Gilliam
(74) *Attorney, Agent, or Firm*—Madan, Mossman & Sriram, P.C.

(57) ABSTRACT

A composition for positive heat sensitive computer-to-plate (CTP) lithographic printing plates comprising a phenolic resin and an IR absorber characterized by the fact that the composition contains from 1 to 30% w/w of an organic oxygenated phosphorous compound chosen from the group of general formula (I):

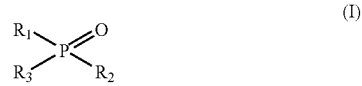

(I)

wherein $R_1$, $R_2$, and $R_3$ are independently a $C_4$–$C_8$ alkyl group or an aryl group.

8 Claims, No Drawings

COMPOSITIONS FOR POSITIVE HEAT SENSITIVE LITHOGRAPHIC PRINTING PLATES

The present invention relates to polymer compositions useful in the preparation of heat sensitive imaging layers for lithographic printing plates for CTP "Computer to Plate" technologies, comprising organic phosphorous compounds as dissolution inhibitors.

Computer to Plate is a technique by which an image is generated on the printing plate by irradiation of a computer guided laser of the appropriate wavelength. The irradiation is followed by the development based on the difference in solubility between exposed and unexposed areas in the polymeric layer.

Many formulations for resists and lithographic printing plates are based on dissolution inhibitors.

It is known that dissolution inhibitors are able to protect the phenolic resins from alkaline attack and is commonly recognized that his mechanism of action is based on hydrogen bond formation between dissolution inhibitor and phenolic groups.

The mechanism of action of dissolution inhibitors is described in many publications. In Macromolecules, 1994, 27, 3330–3336 some dissolution inhibitors are compared, from benzophenone to more structurally complex compounds, such as naphtoflavones.

In Macromolecules 1998, 31, 6549–6553 the efficiency of aromatic ketones, flavones and analogs, is evaluated, for resists preparation.

In different publications, such as in EP 1025992, EP 1025991, EP 1023994, EP 908307 e EP 908779, EP 908779, WO 98/42507 positive IR lithographic printing plates compositions containing aromatic ketones or carboxylic acids as dissolution inhibitors, are described.

From the reported literature it is clear that both the strength of the hydrogen bond between resin and inhibitor and the lipophilic shield of the resin due to the substituents on the dissolution inhibitor are very important for the formation of a shield on the surface of the resin.

If the strength of the hydrogen bond is important when the formulation is exposed to a thermal or electromagnetic radiation, the ability to give a lipophilic shielding is an essential point in image formation during the development and depends on the characteristics of the substituents on the dissolution inhibitor.

It appears from the known technique that in the dissolution inhibitors the lipophilic substituents are disposed on the same plane of the carbonyl or carboxyl group of the molecule.

It has now been surprisingly found that some organic oxygenated phosphorous compounds, bearing substituents right-angled to the P=O group give a more efficient shielding on the resin and are very good dissolution inhibitors in compositions for the preparation of positive litographic printing plates.

It is an object of the present invention a composition for positive heat sensitive CTP lithographic printing plates comprising a phenolic resin and an IR absorber containing from 1% to 30% w/w, preferably between 2 and 20% w/w, of an organic oxygenated phosphorous compound chosen from the group of general formula:

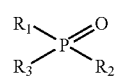

where $R_1$, $R_2$, $R_3$ are independently:
$C_3$–$C_{12}$ linear or branched alkyl group;
phenyl or heteroaryl eventually substituted with $R_4$, where $R_4$ is halogen, $C_1$–$C_{12}$ linear or branched alkyl, $C_1$–$C_{12}$ linear or branched alkoxyl;
$OR_5$ wherein $R_5$ is $C_3$–$C_{12}$ linear or branched alkyl, phenyl or heteroaryl eventually substituted with $R_4$, wherein $R_4$ is halogen, $C_1$–$C_{12}$ linear or branched alkyl, $C_1$–$C_{12}$ linear or branched alkoxyl.

Preferably, in the composition of the present invention
the organic oxygenated phosphorous compound is chosen from the group of general formula (I) wherein $R_1$, $R_2$, $R_3$ are $OR_5$ and $R_5$ is a $C_4$–$C_8$ alkyl group or an aryl group; more preferably, the organic oxygenated phosphorous compound is chosen from the group of general formula (I) wherein $R_1$, $R_2$, $R_3$ are $OR_5$ and $R_5$ is n-butyl or phenyl;

the organic oxygenated phosphorous compound is chosen from the group of general formula (I) wherein $R_1$, $R_2$, $R_3$ are a $C_4$–$C_8$ linear or branched alkyl group or an aryl group; more preferably, the organic oxygenated phosphorous compound is chosen from the group of general formula (I) wherein $R_1$, $R_2$, $R_3$ are n-butyl or phenyl.

In the present text, the term "phenolic resins" is referred to resins containing one or more active phenolic hydroxylic groups.

Particularly, phenolic resins, cresolic resins, novolacks, resols and polyvinylic resins containing phenolic groups, or mixtures of them, can be used.

Normally used IR absorbers having a maximum of absorbance between 700 and 1100 nm can be employed with the dissolution inhibitors of the present invention.

The preferred IR absorber useful for the realization of the present invention have a maximum of absorbance between 780 and 980 nm, and, more preferably, IR absorbers having a maximum of absorbance at about 830 nm.

Examples of utilizable IR absorbers are cyanines, pirilium salts, squarilium salts, oxindolizines; particularly preferred IR absorbers are the cyanines having the following formulas:

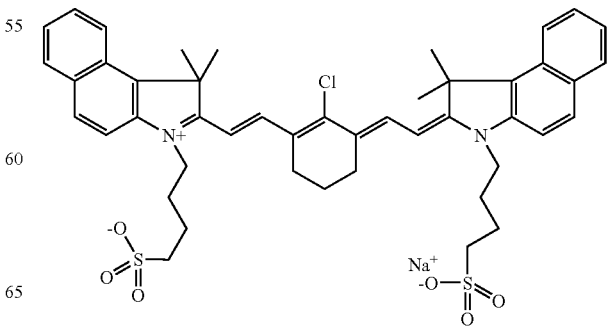

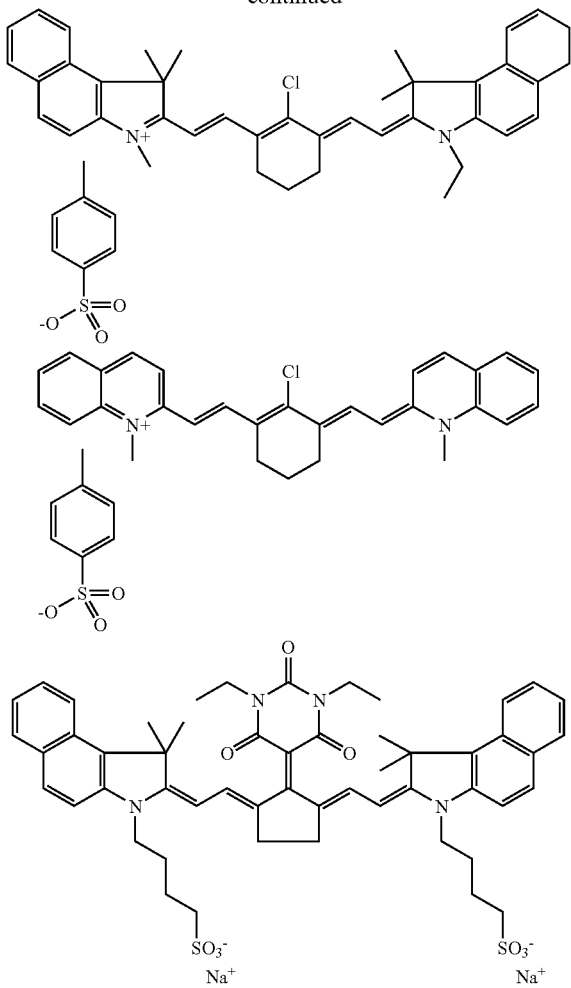

Both a single IR absorber and a mixture of IR absorbers can be used.

Pigments, such as carbon black and anionic carbon black, can also be used as IR absorbers.

Both the phenolic resins and the IR absorber can be used in normal amounts in the composition of the invention, i.e. from 30 to 99% w/w, preferably from 50 to 90% w/w the phenolic resins; from 0,01 to 50% w/w, preferably from 0,1 to 10% w/w, the IR absorber.

The compositions of the present invention are utilizable on common support, such as plates of electrogranite and anodized aluminum, treated with one of the known systems increasing the hydrophilic characteristics of the surface.

For example the aluminum surface can be treated with polyvinylphosphonic acid, polyvinylmethylphosphonic acid, esters of phosphoric acid with polivinylalcohol, polyvinylsulfonic acid, polyvinylbenzenesulfonic acid, sulfuric esters of polyvinylalcohol or acetals of polyvinylalcoohls.

The aluminium support can also be treated on the surface with a solution of sodium silicate at high temperature.

The aluminium support can also be treated with a phosphate solution possibly containing an inorganic fluoride.

Alternatively the support can be a flexible film such as a polyethyleneterephtalate, a cellulose acetate, a polystyrene or polycarbonate film.

The compositions of the present invention can also contain dyes, photosensitizers, surfactants.

The compositions can also contain a printout agent, able to produce a visible image directly after exposure.

Among the utilizable printout agents are combinations of compounds that release acidity after being exposed to heat (thermally unblockable latent acids, usually called "thermal acids") with an organic dye that change its colour with the pH of the medium.

Typical examples of thermal acids are onium salts and trichloromethyltriazines in combination with an IR absorber.

The CTP heat sensitive lithographic printing plates obtained with the compositions of the present invention possess very good characteristics of resolution and development.

EXAMPLE 1

Evaluation of the inhibitors efficiency.

The inhibitors efficiency is evaluated by measuring the weight variation, after drying and alkaline development, of a printing plate coated with a composition of a dissolution inhibitor and a phenolic resin.

A composition consisting of 91,5% w/w of Rutaphen LB744 (Bakelite G.m.B.H.), 7% w/w of one of the dissolution inhibitors reported in Table 1, and 1,5% w/w of Victoria Blue (basic Blue 7-C.I. 42595) was prepared and then dissolved at 20% w/w in a mixture of methylethylketone and methoxyethanol 50:50.

The thus obtained solution was spread with a bar coater Meyer No. 3 on an aluminium plate electrogranited, anodized and then treated with an aqueous mixture of phosphate monosodium and sodium fluoride.

The plate was dried in an oven at 100° C. for 3 minutes, weighted after cooling and then treated for 30 seconds with a sodium methasilicate alkaline developer (conductivity 95 mSiemens at 22° C.).

After drying the weight difference between the plate before and after development was measured.

In Table 1 the percentage of weight variation obtained with different dissolution inhibitors is reported.

TABLE 1

| DISSOLUTION INHIBITOR | WEIGHT VARIATION % |
| --- | --- |
| Triphenylphosphate | −12 |
| Triphenylphosphine oxide | −12 |
| Tri-n-butylphosphine oxide | −30 |
| Tri-n-butylphosphonate | −28 |
| Tri-n-butylphosphate | −28 |

EXAMPLE 2 (comparative)

With the same procedure described in Example 1 the dissolution inhibitors reported in Table 2 were evaluated.

In Table 2 the percentage of weight variation obtained with different dissolution inhibitors is reported.

TABLE 2

| DISSOLUTION INHIBITOR (comparative) | WEIGHT VARIATION % |
| --- | --- |
| Triethylphosphite | −38 |
| Trimetylphosphate | −98 |
| Benzophenone | −71 |
| Flavone | −36 |
| Without inhibitor | −98 |

EXAMPLE 3

Printing Plate Preparation 254 mg of Rutaphen LB744 were dissolved in 1,27 ml of a 50/50 mixture of 2-butanone and propylenglycole monomethylether. At complete dissolution, 20 mg of dissolution inhibitor are added and the mixture is stirred until complete dissolution; 10 mg of a cyanine (2-[2-[2-chloro-3-[[1,3-dihydro-1,1-dimethyl-3-(4-sulphobutyl)-2H-benzo[e]indol-2-yliden]-ethyliden]-1-cyclohexan-1-il]-ethenyl]-1,1-dimethyl-3-(4-sulphobutyl)-1H-benzo [e]indolium hydroxido, sodium inner salt) dissolved in 1 g of methoxyethanol and 1,4 mg of Victoria Blue (Basic Blue 7-C.I. 42595) dissolved in 0,28 g of methoxyethanol were added.

The solution is spread with a bar coater Meyer No. 3 on an aluminium support electrogranited, anodized and treated with a water solution of phosphate monosodium and sodium fluoride.

The plates are dried in an oven for 3 minutes at 100° C.

The printing plates were exposed using a Dainippon Screen CTP-IR "Plate Rite 8000" and developed with a sodium methasilicate developer.

The printing plate so obtained has very good characteristics of resolution and developability.

The invention claimed is:

1. A composition useful for preparing a positive heat sensitive computer to plate (CTP) lithographic printing plates comprising a phenolic resin and an IR absorber characterized by the fact that the composition contains from 1 to 30% w/w of an organic oxygenated phosphorous compound chosen from the group of general formula (I):

wherein $R_1$, $R_2$, and $R_3$ are independently:
a $C_4$–$C_8$ alkyl group or an aryl group.

2. The composition of claim 1 containing from 2 to 20% w/w of the organic oxygenated phosphorous compound.

3. The composition of claim 1 wherein $R_1$, $R_2$, and $R_3$ are n-butyl groups.

4. The composition of claim 1 wherein $R_1$, $R_2$, and $R_3$ are phenyl groups.

5. The composition of claim 1 wherein the IR absorber has a maximum absorbance between 780 and 980 nm.

6. The composition of claim 1 wherein the IR absorber has a maximum absorbance at about 830 nm.

7. A positive heat sensitive CTP lithographic printing plate prepared using the composition of claim 1.

8. A positive heat sensitive CTP lithographic printing plate prepared using a composition selected from the group consisting of: the composition of claim 2, the composition of claim 3, the composition of claim 4, the composition of claim 5, and the composition of claim 6.

* * * * *